April 13, 1971 D. M. HATCH ET AL 3,574,805
METHOD OF MAKING HIGH TEMPERATURE BODIES
Filed Jan. 17, 1966 3 Sheets-Sheet 1
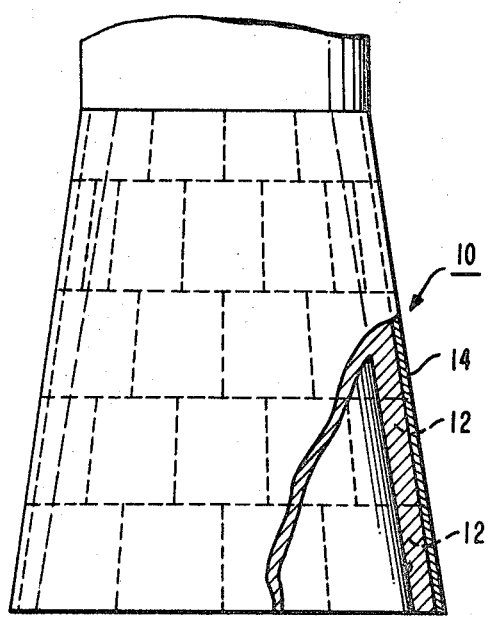
FIG.-1
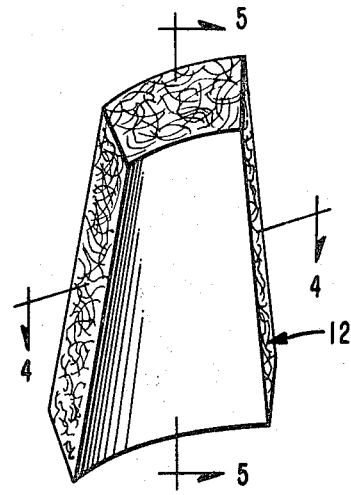
FIG.-3
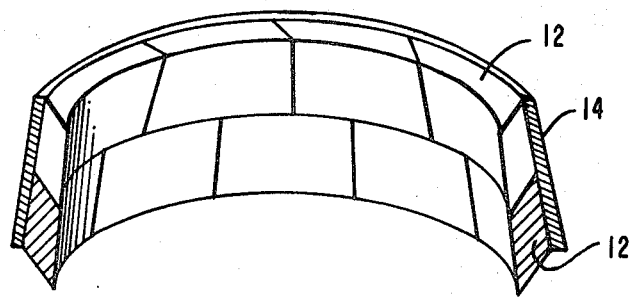
FIG.-2
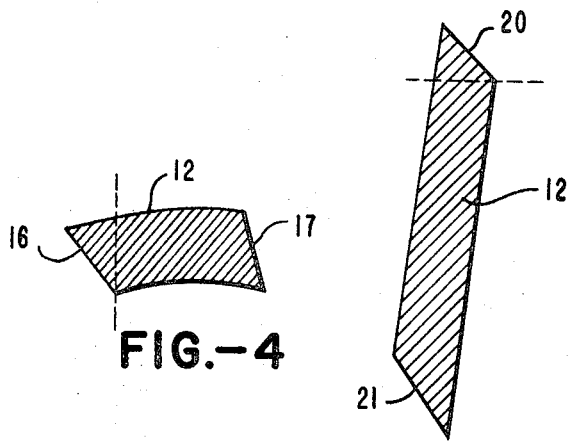
FIG.-4
FIG.-5
INVENTORS
DONALD M. HATCH
WALTER W. WOOD
BY
Fraser & Bogucki
ATTORNEYS

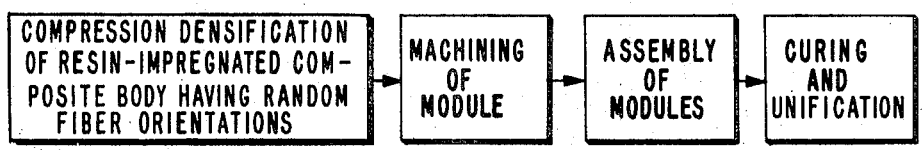
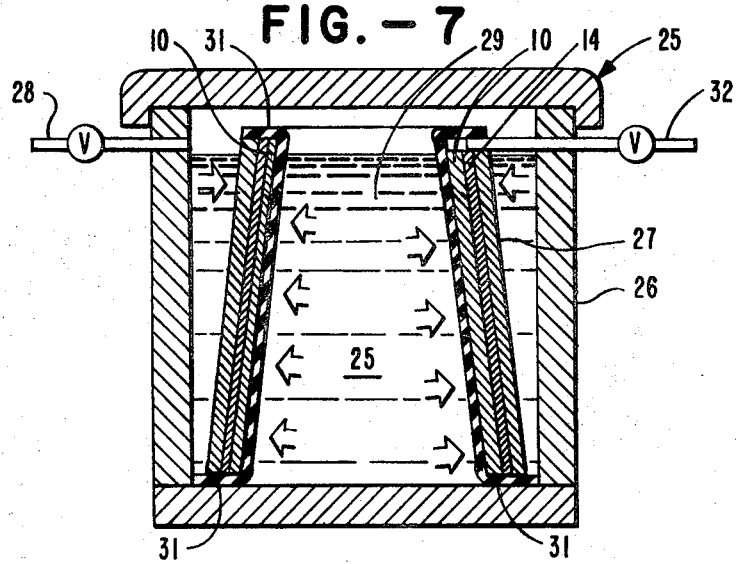
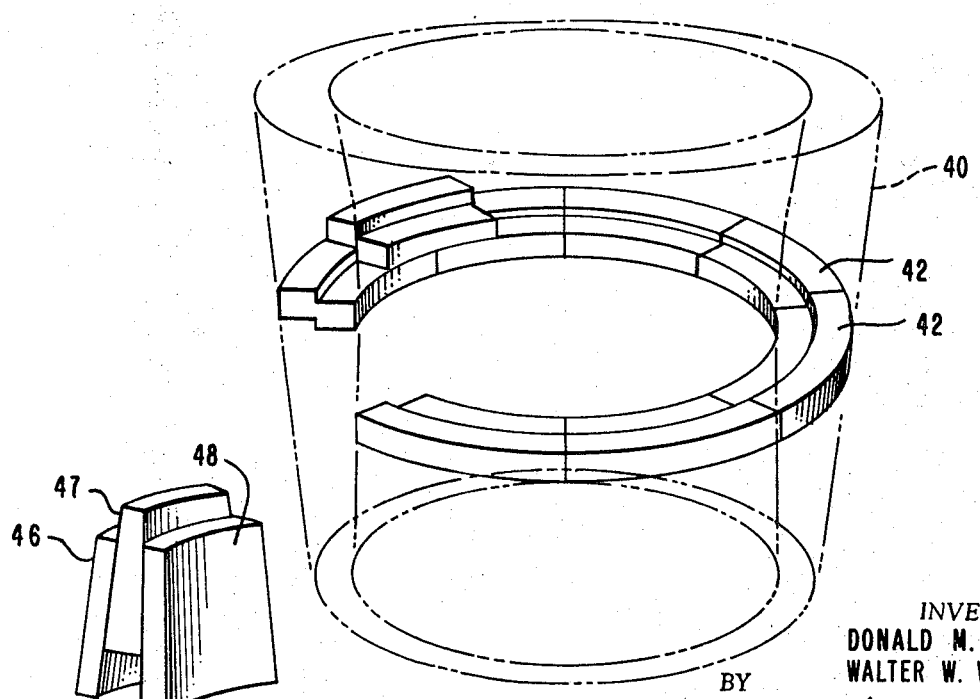

April 13, 1971     D. M. HATCH ET AL     3,574,805
METHOD OF MAKING HIGH TEMPERATURE BODIES
Filed Jan. 17, 1966     3 Sheets-Sheet 3
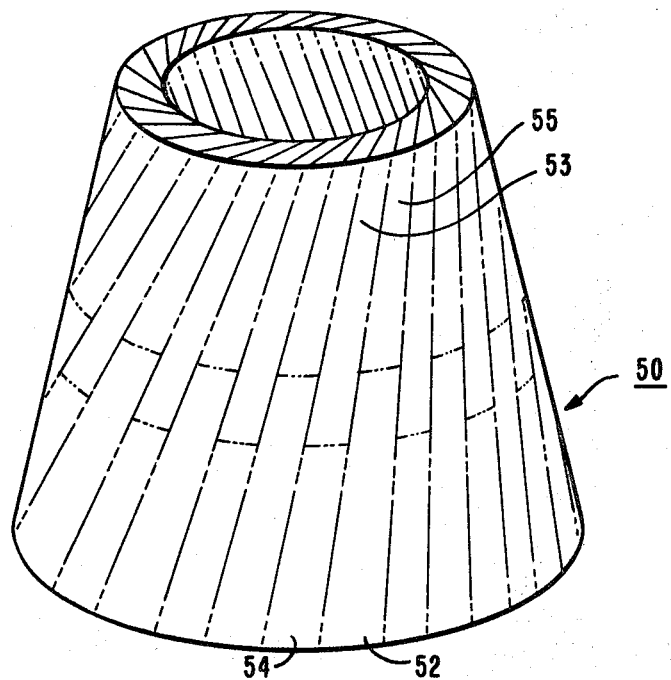
FIG.—10
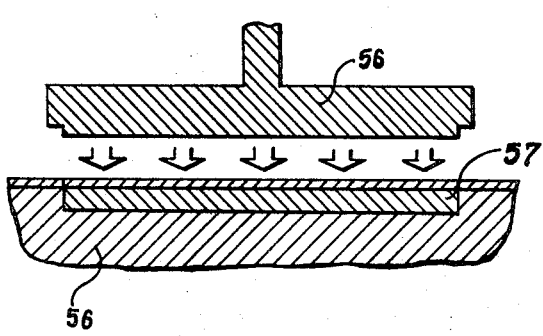
FIG.—11
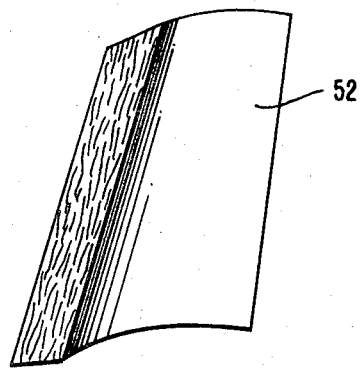
FIG.—12
INVENTORS
DONALD M. HATCH
WALTER W. WOOD
BY
*Fraser & Bogucki*
ATTORNEYS United States Patent Office 3,574,805
Patented Apr. 13, 1971

3,574,805
METHOD OF MAKING HIGH TEMPERATURE
BODIES
Donald M. Hatch, Harbor City, and Walter W. Wood,
Inglewood, Calif., assignors to Hitco
Filed Jan. 17, 1966, Ser. No. 521,152
Int. Cl. B29c 17/04, 23/00; B29d 23/03; B29h 7/02
U.S. Cl. 264—88
4 Claims

ABSTRACT OF THE DISCLOSURE

Large unitary ablative parts are prepared by molding a plurality of individual segments comprising generally randomly oriented fibers disposed within a settable and curable resin matrix at elevated temperatures and pressures to partially cure and densify the segments, followed by assembling the segments into the desired final configuration and thereafter heat curing and densifying the plurality of segments at elevated temperatures and pressures sufficient to join the segments into a finally cured unified structurally stable ablative part.

---

This invention relates to a method of making large high-temperature bodies, and more particularly to low cost, ablative, fiber reinforced bodies of extremely large size.

High-temperature bodies are increasingly being required to withstand extremes of temperature, pressure and gas velocity. For example, thrust mechanisms for liquid and solid fuel rocket engines employ a gas-confining nozzle and expanding conical skirt or exit cone, generally in conjunction with special throat liners. Other parts of the system may require heat shields and other heat absorbing or heat dissipative surfaces. Typically, ablative materials are used in order to combine adequate resistance to high temperatures, high thermal shock, and high gas velocities with adequate insulation against heat propagation. Ablative structures comprise refractory and other high temperature fibers disposed in a high temperature resin matrix, and relay on the strength, melting point and other characteristics of the fibers to control and slow the rate at which erosion occurs.

Inasmuch as an ablative structure is usually of an approximately cylindrical or conical form, it is feasible to build most of such structures by wrapping a sheet or tape of fabric of the desired fibrous material about a suitably configured mandrel, or by disposing a plurality of plies of the fabric within a female mold. By either of these techniques and by related techniques which need not be discussed in detail here, the separate fabric plies or layers are disposed in a fashion giving a superior combination of strength, insulation and erosion resistance. Thereafter, typically the body is densified under high temperature and pressure in a hydroclave or autoclave, with the resin matrix being fully cured.

Techniques of this nature are utilized for forming many different shapes, using most of the available refractory and other fabric materials, but are extremely costly, particularly because of the high cost of the refractory fabrics. Although the fabric materials have advantages over batt, chopped or random fiber materials, they are also many times more expensive. Such costly fabric materials must be utilized where weight is to be kept at a minimum. However, a number of modern systems do not require extremely low weight components and, instead, place primary emphasis on the cost of the component structures. In such systems, ablative and strength characteristics could be satisfied by using a greater quantity of much less expensive material. Moreover, when large ablative components are to be fabricated by tape wound or fabric lay-up techniques, the size of the component is limited by the size of available presses. In addition, in certain circumstances the cost of equipment, such as matched steel tools, tends to be high. Accordingly, it would be very desirable to be able to provide relatively inexpensive ablative components without limitation as to size.

It is therefore an object of the present invention to provide improved methods for fabricating bodies for high temperature applications.

Another object of the present invention is to provide improved methods for fabricating fiber reinforced composite ablative structures for extremely large high temperature systems.

Yet another object of the present invention is to provide a method of producing improved high temperature bodies of extremely large size suitable for exposure to conditions in which severe ablation occurs, which bodies are fabricated in a relatively simple, inexpensive manner largely utilizing conventional equipment and without requiring the use of large matched tools and presses.

These and other objects are achieved by methods in accordance with the invention utilizing separate fabrication and densification of individual sections or modules of a large ablative component. The sections are debulked in a compression mold to a size approximating the desired final dimension and to a density approaching that of the final product, and the individual sections are then unified into a complete structure as final densification and cure is achieved. The method permits the use of sections of different physical and chemical characteristics and the assembling thereof together to provide a finished structure differing from area to area in such characteristics. Accordingly, the method is adapted to the production of highly specialized multi-composition components.

In a specific example of a method in accordance with the invention, refractory fibers, for example, silica fibers, are disposed in substantially random orientation in a phenolic resin system, and hot pressed at a temperature below which cure is initiated in a mold configured to represent a selected segment of a desired large body. The compression debulked body thus provided is of the approximate size and shape desired for the final unit, and in excess of approximately 90 percent of the final density, with the synthetic resin being advanced to a B stage condition. The separate densified segments are thereafter cooled to a desired handling temperature and assembled into the complete body. The composite structure is thereafter unified and fully cured by being heated to a suitable temperature, for example, about 300° F.–350° F., at a pressure of, for example, about 1000 p.s.i. Despite the densification of the earlier step, the pressure and temperature conditions at this subsequent step are sufficient to establish adequate resin flow between the adjacent segments to eliminate the bond regions and to form a finished unitary structure.

Structures in accordance with the invention may further be characterized by shaping the segment edges to provide an interlocking relationship when the segments are assembled. Preferred structures in accordance with the invention dispose ablative structures formed of a plurality of segments within a primary or structural reinforcement body such as a filament wound glass, glass-fabric or metallic shell.

Particular advantages may also be derived from the utilization of individual segments comprising straight or arcuate planar portions of a thick walled body of revolution, with the planes lying approximately along a chord of the body. In accordance with this feature of the invention, one or more relatively shallow molds may be utilized for making a number of substantially similar segments. The individual segments are subsequently assembled in a multi-ply fashion, with each of the segment planes being disposed at an angle relative to the radius of the body of revolution and overlapping about the circumference of the body. This particular construction has the additional advantage of achieving a degree of control of the orientation of the otherwise randomly distributed fibers within the segments. Further, the initial densification of the segments may be carried out to an extent close to the final value, for example, to within 97 percent or more of the final density, because the large contact surfaces between adjacent panels assure complete resin flow and unification during final densification. Further in accordance with this method, the structure under particular circumstances may be better unified by the insertion of impregnated panels of fabric or sheet material between adjacent segments prior to the final densification step.

A better understanding of the invention may be had by reference to the following description, taken in conjunction with the accompanying drawings, in which:

FIG. 1 is a perspective view, partially broken away, of a large ablative structure formed in accordance with the invention, with joinder lines between adjacent segments being indicated in phantom for purposes of a better understanding of the invention.

FIG. 2 is a perspective view of a fragment of the arrangement of FIG. 1 utilizing the segment of FIG. 3 and showing the assembly of the segments prior to final densification and unification; or FIG. 3;

FIG. 3 is a perspective view of an individual, partially densified segment prior to incorporation in a structure such as that of FIG. 1;

FIG. 4 is a plan sectional view of the segment taken along the line 4—4 in FIG. 3;

FIG. 5 is a side sectional view of the segment taken along the line 5—5 in FIG. 3;

FIG. 6 is a block diagram of successive steps employed in methods in accordance with the invention;

FIG. 7 is a sectional view of a pressurizing apparatus for final densification of structures in accordance with the invention;

FIG. 8 is a fragmentary perspective view of a portion of another ablative structure;

FIG. 9 is a perspective view of a multi-segment module for ablative structures in accordance with the invention;

FIG. 10 is a perspective view of a different form of segmented ablative structure in accordance with the invention utilizing a multiplicity of preformed, thick walled ply segments;

FIG. 11 is a sectional, simplified view of a mold mechanism for making an individual segment for the body of FIG. 10; and, FIG. 12 is a perspective view of an individual preformed segment for use in the body of FIG. 10.

Referring now to FIG. 1, an ablative exit cone 10 for an extremely large rocket nozzle, which is, for example, of the order of 200 inches in diameter or more, is illustrated in FIG. 1. This exit cone 10 is completely integrated, even though formed of a plurality of individual segments 12. The segments 12 are initially relatively large, thick walled blocks or modules, physically separate from one another, as seen in the fragmentary view of FIG. 2, prior to final densification. Each segment 12 is a composite fiber-reinforced resin-containing solid body that becomes physically and chemically united to adjoining segments in the final structure 10 during final densification, due to flow of the resin matrix thereof. By composite body is meant a modern high temperature structure including a resin matrix system, such as a phenolic or modified phenolic resin, in which are disposed a plurality of discrete refractory fibers, usually in random configuration. The fibers are of naturally short or naturally long form, or are chopped fiber form. Fibers in the described forms are much less expensive than fibers of the processed, essentially continuous forms such as fabrics. Any suitable high temperature fiber of vitreous silica or other non-metallic oxides, carbon, graphite, asbestos, metallic oxides and the like, natural processed or synthetic can be utilized in the segments 12. Ablative materials which are not truly refractory, such as polytetrafluoroethylene fibers, can also be utilized in the segments 12 for their specific ablative properties. Mixtures of two or more suitable types of refractory and/or non-refractory fibers can be used in the segments 12. Moreover, the segments 12 can differ in composition from area to area of the body 10 in order to provide certain desired characteristics. For example, when an exit cone is being fabricated, the segments in the area of greatest erosion thereof can comprise carbon and/or graphite fibers, while other segments can comprise, for example, silica fibers, all of which segments include suitable cured resin systems.

The disposition of the fibers in a typical segment 12 is best seen in simplified form in FIG. 3. Although the fibers may be long and the orientation may be controlled to some extent by mechanical or pneumatic techniques, usually at least somewhat random orientations thereof exist in the segments 12. The joinder lines indicated in phantom in FIG. 1 denote the various segments 12, but it should be clearly understood that the entire cone 10 is in fact unitary, and the segments 12 thereof are no longer independent and discrete. Although there is substantially no migration of individual fibers between the different segments 12, the resin matrices of adjacent segments unite, so that no true boundary regions between the segments 12 exist after final densification. Those segments 12 which would be exposed to eroding gases during use are reinforced by a primary structure 14, which may be, for example, filament wound glass or tape wound glass fabric.

The body 10 is equivalent in density, configuration and physical characteristics to a body fabricated by a conventional compression molding system of adequate size and pressure capabilities. However, in the case of extremely large bodies, no suitable presses exist in which to conventionally fabricate such a body. Moreover, the present body 10 is far less costly than such conventional structures because the individual segments can be made of relatively small compression presses of available size. Although the body 10 is higher in weight and lower in strength than a comparable body employing oriented fabric reinforcements, this disadvantage is outweighed for many applications by the great reductions in cost, of making the present body 10, inasmuch as material costs are, in many instances, orders of magnitude lower than those of fabric fabricated structures. For example, compression molded parts using random fibers may be made at costs of the order of about $1.00 per pound in contrast to $25.00 to $50.00 per pound for oriented fabric-reinforced bodies.

In accordance with further features of the invention, as illustrated in FIGS. 3–5, the abutting edges of the segments 12 may be angled relative to the radial direction to provide greater surface contact and a shear plane at an angle other than normal to the radial forces in the body 10. Thus, the side edges 16 and 17 may be angled in the same direction with respect to an intersecting radius on the body, as shown, or in opposite directions. If opposite directions are used, the adjacent segments or segments must be angled in complementary fashion. Likewise, the leading and trailing edges 20, 21 may be angled in similar fashion.

The steps shown in the method sequence illustrated in FIG. 6 will give an appreciation of how fabrication is accomplished by the present method in a simple, inexpensive manner. A single mold or a plurality of individual, relatively small mold sets can be used for relatively small segments. If a single mold form is used, the formed segments may be machined to various shapes. Each mold defines a given segment, which may form a generally radial or generally circumferential (or both) part of the composite body.

A mixture of randomly or partially randomly oriented refractory fibers in an A stage resin matrix is placed in the mold and compression densified while at moderate temperature. This hot pressing can take place at, for example, approximately 200° F., e.g., 175° F.–225° F., with a phenolic resin system, and at a suitable pressure, for example, approximately 1000 p.s.i. The particular temperature and pressure selected will depend on the resin system, size of the segment, etc. In this step, the resin is set to a B stage condition. As a result of this compression densification, the individual segments 12 are smooth surfaced bodies free of excess resin and exhibiting densities of, for example, approximately 90 percent or more of the desired final density.

Dependent upon the part configuration and system requirements, however, a number of alternative processing steps may be utilized at this point in the process. For example, some or all of the surfaces of the segment 12 may be machined to achieve desired final dimensions and shapes. In some instances, machining is not needed. No adhesives or bonding agents need be employed. However, opposing surfaces of two adjacent segments can be treated for superior adhesion. This treatment may comprise, for example, partial removal of the resin matrix by immersion to a selected depth in a solvent which acts solely upon the resin matrix, so that the fibers of the segment are exposed for a short distance adjacent the surfaces of the segment. During subsequent pressurization, that is, during final densification, the resin in the segment flows into the resin-free region and the fibers of adjoining segments are interlocked to a limited degree in the joinder region.

The complete body 10 is formed by assebling the individual segments 12, preferably within a primary structure such as a filament body or metallic shell. Male or female molds may also be used, as desired. The resulting composite structure is then finally densified, cured and unified by conventional hydroclaving or autoclaving, utilizing suitable pressures and temperatures, for example, pressures in the range of about 1000 p.s.i. and temperatures in the range of from about 280° F. to about 340° F., for a phenolic resin system and for a typical treating time of about one to six hours.

A conventional hydroclave 25 for pressurizing the body 10 within the external primary structure 14 is shown in FIG. 7. The cone shaped body 10 with the primary structure 14 on the outside thereof are disposed within a pressure vessel 26 with the exterior of the primary structure 14 adjacent to and within a female mold 27 of steel or the like. Water is passed to the interior of the vessel 26 through a valved inlet 28 while the body 10 is sealed therefrom by a strong elastic membrane 31 disposed therearound, as shown in FIG. 7. The membrane 31 prevents hydroclaving liquid from contacting the body 10 and primary structure 14, since the membrane 31 is releasably joined thereto at the upper and lower ends thereof. An exhaust line 32 is also provided in contact with the body 10 and extending through the vessel 26 to the exterior so that material volatilized from the body 10 during hydroclaving (or autoclaving) can be removed from contact therewith. The water or other liquid exerts uniform pressure on the body 10. Uniform radial distribution of pressures by means of the liquid, acting through the membrane 31 and against the individual segments 12 so as to urge the segments 12 toward the mold surface 27, causes the resin to flow between the segments 12. Under the suitable temperature and pressure conditions obtained in the hydroclave 25, as previously described, the resin matrix is fully cured and hardened, with the desired final density. If proper control of the size and configuration of the segments 12 is made prior to the described final densification, the product (body 10) need not be subjected to a final machining operation, but, instead, is ready for use as is.

A different structure also achieved in accordance with the invention is shown in FIG. 8. This figure illustrates a fragment of a throat insert 40 for a rocket nozzle, with the reminder of the insert 40 being shown only in phantom outline. The segments 42 forming the insert 40 are annular, and have offset surfaces to provide greater intersegment planar surface contact areas. These offset portions assure radial seating and locking of each circumferential ring segment 42 relative to the segments 42 which are immediately above and below that segment, as seen in FIG. 8.

A different form of segmentation and a tongue-in-groove effect are shown in the example of FIG. 9. Where it is desired to have this type of locking arrangement, conventional compression molding techniques may require special tooling in order to release the formed part. Instead, each module may comprise a number of segments or subsegments 46, 47, 48 with the intermediate segment (subsegment) 47 being offset radially or circumferentially relative to the adjoining side segments (subsegments) 46, 48.

In a different arrangement in accordance with the invention, referring now to FIGS. 10–12, the segmentation is in a planar form, although the planes may comprise relatively thick bodies and may be flat or curved. A thick walled body of revolution 50 is formed of a plurality of generally similar planar segments 52, 53, 54, 55. Each of these planar segments extends from an outer surface of the body to an inner surface thereof along a chord line, either straight or curved, lying at an angle to the intersecting radius of the body 50. Thus, a plurality of circumferentially overlapping segments are built up about the body 50, and each of the like segments 52, 53, 54, 55 may be made from an individual mold.

The present example of FIG. 10 shows a transverse division of the body 50, in order that relatively short mold lengths can be used, as shown in FIG. 11, in preparing the segments from which the body 50 is built up. A single long flat mold can be used, however, if this type of segmentation is not desired. In any event, the compression molding system can be a low-cost unit 56, as shown in FIG. 11. In providing these individual panel segments, a mat or batt 57 comprising random fibers and a suitable resin matrix is hot pressed in a direction normal to the flat surface of the part to form the segment. There is thus substantial compression in this direction. Depending on the extent of compression, the fibers are more or less reoriented so as to lie in planes generally parallel to the broad surfaces of the segment. Because of the large planar surface contact and because the segments 52–56 are at an angle to radial forces, improved joinder is achieved between the segments during fabrication of the body 50 in the previously described manner.

The interleaved segments 52–56 also provide a longitudinal interlock function by virtue of the alternation or staggering of short and long segments in the body 50, although this is not required for requisite stability of the body 50. Various combinations of full length and partial length segments may also be employed. Moreover, fabric layers impregnated with a resin in the B stage may be interposed between the segments. While increasing the material cost, interposed fabric layers do also enhance the structural and ablative properties of the ablative body without requiring special tooling when used in this way. As another example, lightly impregnated fabric layers or layers of other sheet material may be interposed between the segments in forming the desired structure, if the segments are excessively "wet," i.e. have excess resin.

What is claimed is:

1. A method of forming extremely large ablative parts at low cost, which method comprises molding a plurality of individual segments, each comprising a plurality of short fibers disposed in generally random orientation within a settable and curable resin matrix, said resin when cured having a hardness sufficient to permit machining, densifying the plurality of segments at elevated temperatures and pressures sufficient to partially densify said segments to a value in excess of at least 90 percent of the desired final density and to partially cure said resin to a hardness sufficient to permit machining, machining the individual densified segments to desired configurations, assembling the configured segments into an ablative part, and unifying the part by pressurizing the assembly in a hydroclave or autoclave at an elevated temperature for a time sufficient to flow the resin between said segments and set and finally cure the resin.

2. The method of claim 1 wherein said fibers are refractory fibers, wherein said molding is effected at an elevated temperature and pressure sufficient to set the resin matrix to B stage cure, but insufficient to fully cure the resin matrix, and wherein during said unifying the part is further densified.

3. The method of claim 2 wherein the resin is a phenolic resin.

4. The method of claim 2 wherein the fibers of at least some of said segments differ in chemical composition and ablative characteristics from the fibers of the remaining segments and wherein the segments are disposed during said assembling in selected areas according to the fiber composition thereof, whereby said part differs in ablative characteristics from area to area.

References Cited

UNITED STATES PATENTS

| | | | |
|---|---|---|---|
| 2,000,769 | 5/1935 | Mansur | 264—258X |
| 2,517,090 | 8/1950 | Denning | 264—263X |
| 2,749,266 | 6/1956 | Eldred | 264—137 |
| 2,958,621 | 11/1960 | Freeman et al. | 24—258 |

ROBERT F. WHITE, Primary Examiner

T. J. CARVIS, Assistant Examiner

U.S. Cl. X.R.

264—120, 250, 138, 314